Dec. 6, 1949     O. THURMAN, JR     2,490,175
COMBINATION FLASH ARRESTER AND CHECK VALVE
Filed May 30, 1944     2 Sheets-Sheet 1
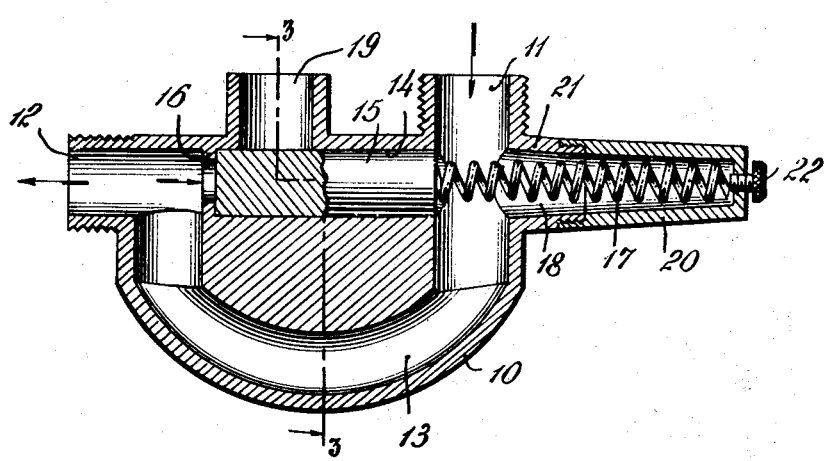
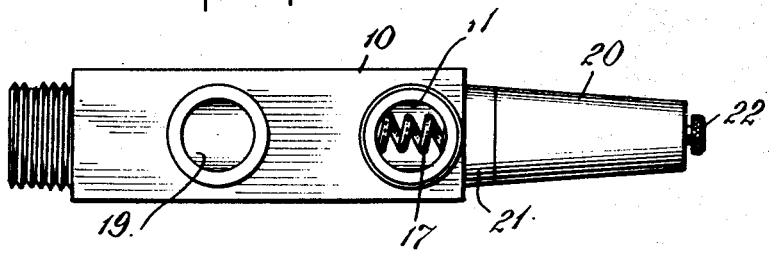
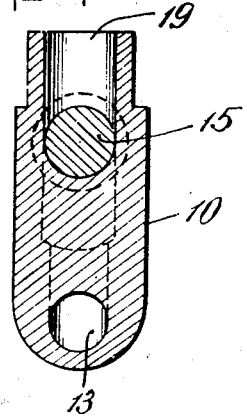
INVENTOR.
OLIVER THURMAN, JR.
BY
Pennie, Davis, Marvin, and Edmonds
ATTORNEYS Dec. 6, 1949  O. THURMAN, JR  2,490,175
COMBINATION FLASH ARRESTER AND CHECK VALVE
Filed May 30, 1944  2 Sheets-Sheet 2
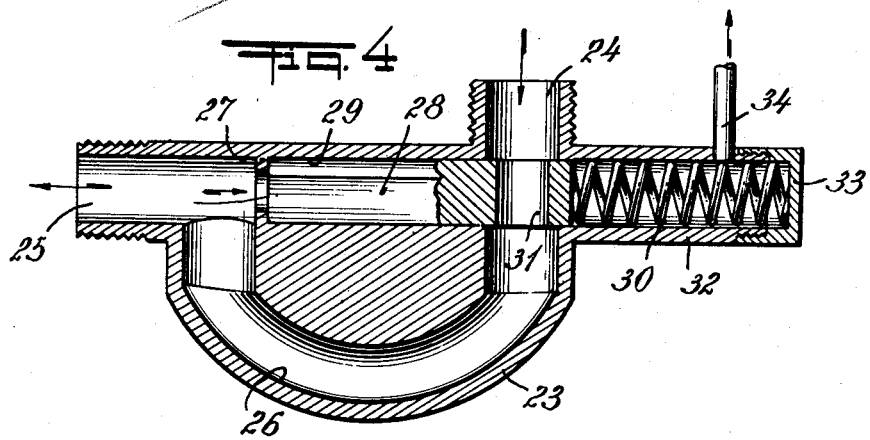
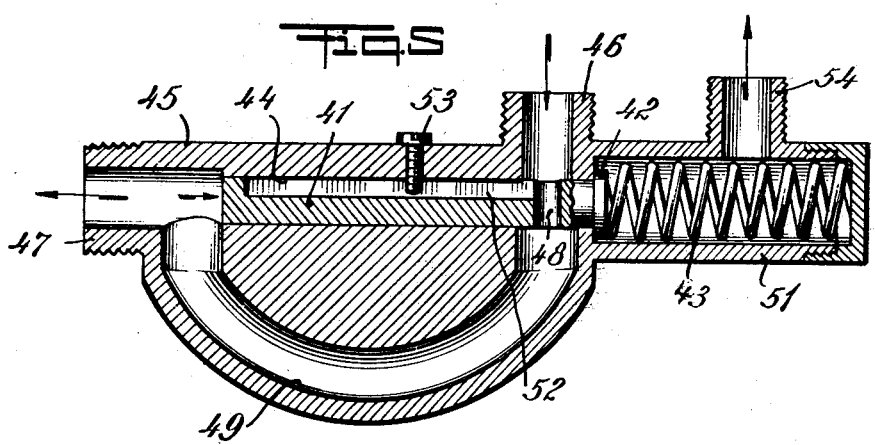
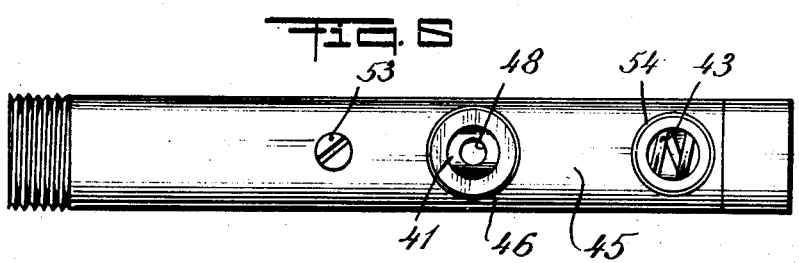
INVENTOR.
OLIVER THURMAN, JR.
BY
Pennie, Davis, Marvin and Edmonds
ATTORNEYS Patented Dec. 6, 1949

2,490,175

UNITED STATES PATENT OFFICE 2,490,175

COMBINATION FLASH ARRESTER AND CHECK VALVE

Oliver Thurman, Jr., Mountain Lakes, N. J., assignor to Air Reduction Company, Incorporated, New York, N. Y., a corporation of New York Application May 30, 1944, Serial No. 538,095

9 Claims. (Cl. 137—153)

This invention relates to flash arresters for interrupting flashbacks occurring in the gas supply lines of oxy-acetylene welding and cutting equipment.

A conventional check valve in the acetylene line of such equipment is ineffective to stop a flashback. The failure of this check valve to be effective may be because the flashback consists of a pressure wave or surge followed by a flame, so that even though the pressure wave closes the check valve, the valve rebounds to an open position to let the flame that follows the surge pass through the check valve, or because the velocity of the pressure wave and/or flame is so great that it passes the check valve before the inertia of the check valve can be overcome and the valve closed, or because the flame precedes the pressure wave and thus passes through the check valve before there is any surge of gas to close the valve.

It is an object of the present invention to provide a flash arrester of the check valve type wherein operation of the valve to arrest the flashback and cut off the gas flow, is assured regardless of whether the flame precedes or follows the pressure wave.

It is another object of the invention to provide an arrester of such construction that it can also serve as the check valve of the system.

It is another object of the invention to provide a flash arrester which is of simple construction and more or less automatic in operation.

According to the present invention there is provided within a body or valve housing, a passageway which is extended between an inlet and an outlet in a circuitous manner wherein the gas is required to travel an extra long distance through the arrester. But extending directly, or the shortest distance between the inlet and the outlet, and separate from the passageway, is a valve opening in which there is a valve. The arrangement is thus such that this valve is responsive to a flashback pressure within the outlet, at a point which is in advance of the valve seating portions, and is adapted when actuated by such flashback to cut off the gas flow in the inlet. By virtue of the long circuitous passageway about the valve, the flame can be accommodated therein until a pressure wave has operated the valve. With one form of the invention, the valve is allowed to stick in a tapered section and there be retained against the action of a spring, tending to return the valve to a normally open position. In another form of the invention, the valve element serves as a relief valve whereby the gas being delivered to the arrester is momentarily diverted to the atmosphere until the gas flow through the arrester can be re-established. Certain of the forms of the invention are constructed to serve as the check valve for the system.

For other objects and for better understanding of the invention, reference may be had to the following detailed description taken in connection with the accompanying drawing in which:

Fig. 1 is a cross-sectional view, in side elevation, of one form of the invention;

Fig. 2 is a top plan view of the form of the invention shown in Fig. 1;

Fig. 3 is the cross-sectional view, in endwise elevation, taken in the region indicated by line 3—3 of Fig. 1;

Fig. 4 is a cross-sectional view similar to Fig. 1, of a second form of the invention;

Fig. 5 is a cross-sectional view of a third form of the invention differing generally from the forms of the inventions shown in Figs. 1 and 4, by the use of a key and slot for preventing rotation of the valve in the valve opening and by the inclusion of a relief vent for the inlet gas when the flow thereof through the arrester has been intercepted;

Fig. 6 is a top plan view of the form of the invention shown in Fig. 5; and

Fig. 7 is a top plan view of the valve element used in the form of the invention shown in Fig. 5.

Referring now to the form of the invention shown in Figs. 1, 2 and 3, there is provided a body or housing 10 having an inlet 11 and an outlet 12, and a circuitous passageway or loop-section 13 extending between the inlet and the outlet. Also, interconnecting the inlet and outlet, at the shortest distance therebetween, is a valve opening 14 in which a valve 15 may slide. The slide valve 15 is normally held against an annular abutment 16 by a spring 17 extending through a tapered section 18 of the valve opening and engaging the right-hand end of the valve. With the slide valve 15 so retained against the abutment 16, a vent 19 located intermediate the inlet and outlet is sealed off from the valve opening 14. The spring 17 is retained at its outer end by a removable housing 20 carried on a threaded projection 21 which includes the tapered section of the valve opening 14.

The general flow of the gases through the flash arrester is in the direction of the arrows and from the inlet 11 through the circuitous passageway 13 and out of the outlet 12. It should be noted that this path for the normal gas flow through the arrester is by no means the shortest distance between the inlet and outlet, but is of an extended length.

In the event of the flashback, the pressure surge acts against the left-hand end of the slide valve 15 and forces the right-hand end of the slide valve 15 into the tapered section 18 of the valve opening so as to become stuck therein and unable to rebound to its normal position. The passageway 13 is made long so that the pressure surge has sufficient time to move the slide valve 15 into the cut-off position before any flame-front can travel its length to the inlet 11. Portions of the flame and any continuing flame will pass into the valve opening 14 and be exhausted through vent 19 to the atmosphere. The valve 15 and opening 14 are of circular cross-section. The valve, having been extended across the inlet 11, cuts off the normal gas flow through the arrester.

The flash arrester is reset for another operation by removal of a plug 22 in the spring housing 20 and the insertion of an instrument therein through the coil spring and into engagement with the right-hand end of the slide valve 15.

Referring now to the form of invention shown in Fig. 4, there is provided a body 23 similar to body 15 of Fig. 1, except for the vent. This body or valve housing 23 has a similar inlet 24, outlet 25, circuitous passageway 26, and annular abutment 27. A valve 28 is movable within valve opening 29, and, when retained against the abutment 27 by a spring 30, has a transverse gas passage 31 thereof registered with the inlet 24. The normal flow of the gas, after leaving gas passage 31, is by way of the circuitous passageway 26 to the outlet 25. The right-hand end of the valve extends beyond the inlet 24 and into a housing 32 for spring 30. This housing is considerably longer than the projection 21 of Fig. 1 and is without a tapered section. A threaded closure cap 33 retains the spring 30 within the housing 32 and can be screwed one way or the other to change the length of the spring and thus regulate its pressure. A vent 34 is provided so that air pressure within the spring housing 32 does not exceed atmospheric pressure. The valve 28 is balanced as to the gas pressure in the inlet, and functions as a check valve in case of light pressure caused by back flow in the outlet line. The spring 31 is of such strength as to hold the left-hand end of the valve 28 against the abutment 29 during the normal gas flow through the arrester.

Upon the occurrence of a flashback the valve 28 is forced into the spring housing 32 to such an extent that the passage 31 of the valve is forced out of registry with the inlet 24, and the inlet 24 becomes closed to the inlet gas. When the surge has receded in the outlet 25 the valve 28 is automatically returned to the left and the normal flow of gas through the inlet 24 is re-established. Valve 28 and opening 29 are non-circular to prevent the valve passage 31 from being turned out of axial alignment with inlet 24.

In the form of the invention shown in Figs. 5, 6 and 7, a slide valve 41 is of round cross-section and has a flange 42 which limits the extent of movement to the left under the pressure of a spring 43. This slide valve 41 is movable within a valve opening 44 extending between an inlet 46 and an outlet 47 thereof, and has a transverse opening 48 adapted to be aligned within the inlet 46 to permit the flow of gas from the inlet 46 to outlet 47 by way of a circuitous passageway 49.

Upon the occurrence of a flashback, the surge bears against the left-hand end of the valve 41, and the right-hand end of the valve 41 is forced into a spring housing 51 containing the spring 43.

The valve 41 contains a channel 52 within its upper surface, into which a set screw 53 extends to prevent the slide valve from turning into a position in which the opening 48 would not be in line with the inlet 46.

This form of the invention, however, serves not only as a flash arrester but as a relief valve for the gas supply line. With the slide valve displaced to the right, the gas from the inlet 46 flows through the channel 52 into the spring housing 51 and out through a relief vent 54. By such a construction the normal flow of the gas from the gas source is not interrupted by the momentary flashback. The flashback is of such momentary duration no great loss of gas escapes through the vent 54. This form is also of the balanced valve type and serves as a check valve for the gas line.

It should now be apparent there has been provided a flash arrester which is of simple construction and one in which operation of its valve is complete before the flashback flame front reaches the valving parts.

I claim:

1. A combined flash arrester check valve assembly for combustible gas systems comprising a body having an inlet and an outlet and a circuitous passageway extending between the inlet and the outlet for carrying the flow of gas through the body, an opening in the body extending as a chord with respect to the circuitous passageway adjacent the respective inlet and the outlet, a flashback-responsive valve in said opening, and normally biased toward the outlet but movable in response to a flashback for cutting off the supply of gas from the inlet to the passageway, said passageway being of such length that the flashback has sufficient time to effect the cutting off operation before the flashback has reached the inlet, said body being vented so that said valve is balanced to function as an ordinary check valve for the system.

2. A flash arrester for combustible gas pressure systems comprising a body having a valve opening extending longitudinally therethrough and an abutment extending into the valve opening, said body having an inlet and an outlet and a circuitous passageway extending about the valve opening and between the inlet and the outlet, a valve movable in the valve opening in response to a flashback in the outlet to cut off the normal flow of gas being delivered from the inlet to the passageway, a valve spring housing on the body in axial alignment with the valve opening, and a valve spring in the spring housing for normally retaining the valve against the abutment in the valve opening.

3. A flash arrester for combustible gas pressure systems, comprising a body having an inlet and an outlet and a circuitous passageway extending between the inlet and the outlet, said body further having an opening extending longitudinally therethrough, one end of said opening communicating with the inlet and having a slightly tapered section and the opposite end of the opening communicating with the outlet, a valve in said opening and responsive to flashback pressure in the outlet and movable upon the occurrence of a flashback to cut off the flow of gas from the inlet to the circuitous passageway and to fasten itself within the tapered end section of the valve opening there to be retained until manually released.

4. A flash arrester for combustible gas pressure systems comprising a body having an inlet and an outlet and a circuitous passageway extending between the inlet and the outlet, said body further having an opening extending longitudinally therethrough, one end of said opening communicating with the inlet and having a slightly tapered section, the other end of the opening communicating with the outlet and having an abutment therein, a valve in said opening and responsive to flashback pressure in the outlet and movable upon the occurrence of a flashback to cut off the flow of gas from the inlet to the passageway and to fasten itself within the tapered end section of the valve opening there to be retained until manually released, and spring retaining means extended into the opening through the tapered section thereof for normally retaining the valve against the abutment.

5. A flash arrester for combustible gas pressure systems comprising a body having an inlet and an outlet, a circuitous passageway extending between the inlet and the outlet, and a vent for flashback gases intermediate the inlet and the outlet, said body further having an opening extending longitudinally therethrough and communicating at one end thereof with the outlet and intermediately of the ends with the vent, a valve in the opening biased normally to close off the communications of the opening with the outlet and vent portions and to leave the inlet free for normal flow of combustible gas past the opening and through the valve body by way of the circuitous passageway, and said valve upon the occurrence of a flashback in the outlet being operable to cut off the flow of gas from the inlet to the circuitous passageway and to effect escape of flashback gas through the valve opening and the vent.

6. A flash-arresting and gas relief assembly for combustible gas pressure systems comprising a body having an inlet and an outlet and a circuitous passageway extending between the inlet and the outlet, said body having a valve opening extending longitudinally therethrough and a spring housing running coextensively with the valve opening, one end of said opening connecting with the inlet and the spring housing and the opposite end of said opening connecting with the outlet, a valve movable within the valve opening and extending through the inlet portion and into the spring housing, a spring within the housing for normally urging the valve toward the outlet, said valve having an opening adapted to be aligned normally with the inlet to permit the normal gas flow from the inlet to the outlet by way of the circuitous passageway but movable in response to flashback pressure to locate the opening thereof out of alignment with the inlet to thereby cut off the gas flow through the inlet, said valve further having a longitudinally extending passageway adapted when the valve has been moved in response to a flashback to divert the inlet gas to the spring housing and a gas relief vent in the spring housing.

7. A flash arrester for combustible gas pressure systems comprising a body having a gas inlet, a valve movable in the body in a direction at right angles to the axis of the inlet and extending to and terminating at a position in the body which is remote from the inlet, a gas outlet in the body coaxial with the valve and adjacent the end of the valve at said remote position, a circuitous gas passageway leading from the inlet and communicating with the outlet beyond said end of the valve, said valve in its normal open position serving to establish communication between the inlet and said passageway, yielding means for biasing the valve to its open position, said circuitous gas passageway being of such length that the flashback flame will not reach said inlet before the valve has been moved by the flashback to closed position in which it shuts off communication between the inlet and said passageway and said valve being adapted to be moved against the action of said yielding means by a flashback in the outlet not only to a closed position in which it just shuts off such communication but for a substantial distance beyond such position.

8. A flash arrester for combustible gas pressure systems comprising a body having a gas inlet, a valve movable in the body in a direction at right angles to the axis of the inlet and extending to and terminating at a position in the body which is remote from the inlet, a gas outlet in the body coaxial with the valve and adjacent the end of the valve at said remote position, a gas passageway in said body, a valve having a transverse opening adapted in the normal open position of the valve to establish communication between the inlet and said passageway, yielding means for biasing the valve to its open position, said passageway extending in a circuitous manner from said transverse opening in the valve to said outlet beyond said end of the valve, and being of such length that the flashback flame will not reach said inlet before the valve has been moved by the flashback to closed position in which it shuts off communication between the inlet and said passageway and said valve being adapted to be moved against the action of said yielding means by a flashback in the outlet to a position beyond that at which the transverse opening in the valve just closes communication between the inlet and the passageway so that there is a sufficient interval of time before the yielding means opens the valve to prevent propagation of the flashback into the inlet.

9. A flash arrester for combustible gas systems comprising a body having an inlet and an outlet and a circuitous passageway extending between the inlet and the outlet through which normal gas flow is established, and valve means having a portion subject to flashback pressure in the outlet and also a portion for cutting off the flow of gas being delivered from the inlet to the circuitous passageway whereby a flashback will move the valve means to closed position in which said last-named portion closes communication between the inlet and the circuitous passageway, said passageway being of such length that the flashback flame will not reach said inlet before the valve means has been moved by the flashback to closed position.

OLIVER THURMAN, Jr.

REFERENCES CITED

The following references are of record in the file of this patent:

UNITED STATES PATENTS

| Number | Name | Date |
| --- | --- | --- |
| 542,024 | McIlhenny | July 2, 1895 |
| 1,196,561 | Lower | Aug. 29, 1916 |
| 1,563,143 | Bailie | Nov. 24, 1925 |
| 2,024,042 | Jance | Dec. 10, 1935 |
| 2,127,849 | Stone | Aug. 23, 1938 |